United States Patent [19]
Bleile et al.

[11] Patent Number: 5,937,058
[45] Date of Patent: Aug. 10, 1999

[54] COORDINATING TELEPHONES OR ADJUNCTS ON THE SAME LOOP

[75] Inventors: Leonard George Bleile; Christopher Henry Becker; Steven Kos, all of Calgary, Canada

[73] Assignee: Northern Telecom Limited, Montreal, Canada

[21] Appl. No.: 08/715,823

[22] Filed: Sep. 19, 1996

Related U.S. Application Data

[60] Provisional application No. 60/004,069, Sep. 21, 1995.

[51] Int. Cl.⁶ .................................................... H04M 1/00
[52] U.S. Cl. ........................ 379/377; 379/376; 379/373; 379/194; 379/195; 379/372
[58] Field of Search ..................................... 379/377, 376, 379/373, 372, 382, 142, 215, 194, 195, 204, 205, 161, 168, 169, 421, 143, 388, 210, 221, 157, 164

[56] References Cited

U.S. PATENT DOCUMENTS

| | | | |
|---|---|---|---|
| 4,351,986 | 9/1982 | Fechalos | 379/164 |
| 4,893,334 | 1/1990 | Parnello | 379/157 |
| 5,038,140 | 8/1991 | Ikeuchi | 379/221 |
| 5,222,122 | 6/1993 | Hamilton et al. | 379/143 |
| 5,263,084 | 11/1993 | Chaput et al. | 379/215 |
| 5,283,825 | 2/1994 | Druckman et al. | 379/167 |
| 5,392,341 | 2/1995 | Wilkinson et al. | 379/210 |
| 5,581,598 | 12/1996 | Hachiga | 379/388 |
| 5,619,561 | 4/1997 | Reese | 379/142 |

FOREIGN PATENT DOCUMENTS

WO 96/25816  8/1996  WIPO.

OTHER PUBLICATIONS

"The Analog Display Services Interface", B.K. Schwartz, IEEE Communications Magazine, vol. 31, No. 4, Apr. 1993, pp. 70–75.

*Primary Examiner*—Dwayne D. Bost
*Assistant Examiner*—Keith Ferguson
*Attorney, Agent, or Firm*—Yoshiharu Toyooka

[57] ABSTRACT

When two or more telephone sets are in use on the same subscriber's loop, their activities may not be properly detected or monitored by the central office switch. The present invention provides a method of and an apparatus for coordinating activities so that call waiting caller ID or off-hook caller ID or other service features can work even if there are off-hook extensions on the same loop. The invention ensures that only one set among a plurality of off-hook sets responds to the switch.

16 Claims, 6 Drawing Sheets

COORDINATING TELEPHONES OR ADJUNCTS ON THE SAME LOOP

This is a Provisional Application No. 60/004,069 filed Sep. 21, 1995.

FIELD OF THE INVENTION

The invention generally relates to signaling in a subscriber's loop circuit between CPEs (customer premise equipments) and a switch at a CO (central switching office). In particular, it is directed to a situation where a plurality of CPEs are connected to a subscriber's loop circuit.

BACKGROUND OF THE INVENTION

In addition to customer's payload signals such as voice, data or other forms of information, a subscriber's loop circuit carry various control signals which are exchanged between a CPE and a switch at a CO. These control signals (simply called local signal or signaling) are generated according to a widely accepted signaling protocol and perform functions such as, ringing, detecting the off-hook, on-hook or line-busy conditions and so on. Recently much more functions are added to those existing ones in order to provide new types of customer services. These new services include call answer, call waiting, call forward, and caller identification to name a few.

Figure 1:
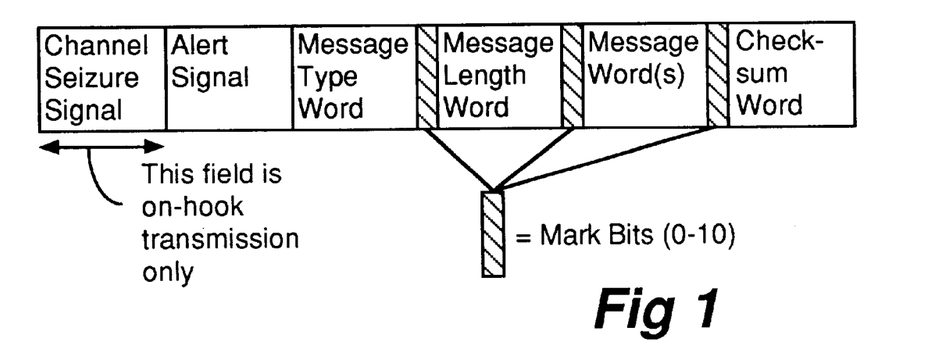
FIG. 1 shows fields of the data format of CLASS.

CLASS (custom local area signaling services) is a signaling protocol currently being widely accepted by the industry to provide this wide range of services. This will be described in detail below as an example. Control data format in CLASS is serial, binary and asynchronous. The modulation is voiceband FSK, using 1200 and 2200 Hz for logical 1 and 0 respectively. FIG. 1 shows fields of the data format of CLASS. Each data word consists of an 8-bit byte, each data word is preceded by a start bit (space) and followed by a stop bit (mark), a total of 10 bits in a word. Transmission of any 8-bit character is supported in a message word. The alert signal consists of 180 bits (in on-hook transmission) and 80 bits (in off-hook transmission) of continuous mark. The channel seizure signal is present during on-hook transmission only. It consists of 300 continuous bits of alternating space and mark, beginning with space and ending with mark. The transmission rate is 1200 Baud.

SCWID (Spontaneous Call Waiting InDication) or Call Waiting Caller ID or off Hook Caller ID is a technique of signaling to the subscriber the identity of a call waiting caller while the subscriber is off-hook on another call. The subscriber can then choose to talk to the call waiting caller by performing a hook flash or "Link". This feature is one of many services which are envisaged and are being implemented by using CLASS. In this application due to lack of a proper terminology, SCWID is used throughout to indicate these features which use off-hook signaling. U.S. Pat. No. 5,263,084 issued on Nov. 16, 1993 to Chaput et al. describes the operation of one typical off-hook signaling technology.

Briefly the protocol is as follows: When a caller is waiting, the office switch sends a SAS (subscriber alert signal) tone and then a CAS (custom alert signal) tone in voiceband. The subscriber apparatus detects the CAS tone and if it is capable of receiving further CLASS or other information it returns to the switch an ACK (acknowledge) signal (a DTMF tone). The switch then sends the FSK data packet containing the call waiting caller's identity or any other information in the data format described above. During the time from the CAS to the end of the FSK data packet the subscriber apparatus mutes the RX and TX paths to subscriber so that they will not hear or possibly corrupt the data transport mechanisms.

BellCore, who set forth a CLASS procedure, recommends that SCWID equipped subscriber apparatus (telephone set) should check if there are any off-hook extensions on the loop before sending back the ACK to the switch after reception of a CAS. If the switch does not receive an ACK from the subscriber apparatus within a predetermined period of time (e.g., maximum of 100ms), it will not send FSK data containing the call waiting caller ID. In the known arrangement, SCWID equipped subscriber apparatus and adjuncts monitor the DC conditions on the loop and if an extension is detected then they do not send an ACK to the switch. This means that call waiting caller ID or off-hook caller ID or other off-hook signaling does not work if an extension is off-hook.

It should be noted that while the description which will follow deals primarily SCWID (off-hook caller ID), FSK signals which are exchanged between the terminal and office switch after the ACK signal can be used to transmit different information in addition to the caller ID for a variety of other services.

OBJECTS OF THE INVENTION

It is therefore an object of the invention to provide a method and apparatus for coordinating activities so that off-hook signaling can work even if there are off-hook extensions on the same loop.

It is a further object of the invention to provide a method of and apparatus for assigning one of the CPEs to respond to off-hook signaling from the switch.

It is still an object of the invention to provide a method of and apparatus for assigning dynamically one of the CPE to respond to off-hook signaling from the switch.

SUMMARY OF INVENTION

Briefly stated, the invention relates to a telephone loop which contains a plurality of telephone sets at one end and a telephone switch at the other end. In one aspect the invention is directed to a method of acknowledging a customer alert signal sent by the telephone switch when the telephone loop is in the condition in which at least one telephone set of the plurality of telephone sets is off-hook. The method comprises steps of assigning a first telephone set to transit to off-hook state as a master among the plurality of the telephone sets and the remaining sets as slaves during a telephone call and detecting the customer alert signal at the master. The method further includes a step of appropriately responding to the customer alert signal depending upon the state of one or more remaining telephone sets to indicate that the plurality of telephone sets are ready to receive off-hook signals from the telephone switch.

According to another aspect, the invention is directed to a telephone set to be connected to a telephone switch by way of a telephone loop. The telephone set of the invention includes a circuit for monitoring the DC condition of the telephone loop to determine if one or more telephone sets are off-hook state among a plurality of telephone sets which are connected to the telephone loop and a demod circuit for detecting a customer alert signal sent by the switch connected to the telephone loop when the telephone loop is in an off-hook condition. The telephone set further includes a line operation circuit for sending an acknowledgment signal in response to the customer alert signal, and a controller for assigning one telephone set as a master if it is the first telephone set to transit to off-hook state among the plurality of telephone sets and for enabling the line operation circuit if the telephone set is assigned as master.

DETAILED DESCRIPTION OF PREFERRED EMBODIMENTS OF INVENTION

As described earlier, in the known arrangement, a subscriber set monitors the DC conditions on the loop and if an extension-in-use is detected, when they receive a SCWID signal (e.g. CAS), they do not send an ACK to the switch, even though the both sets are equipped with the capability of SCWID or similar off-hook signaling. This means that call waiting caller ID or off-hook caller ID or such features do not work if an extension is off-hook.

Figure 2:
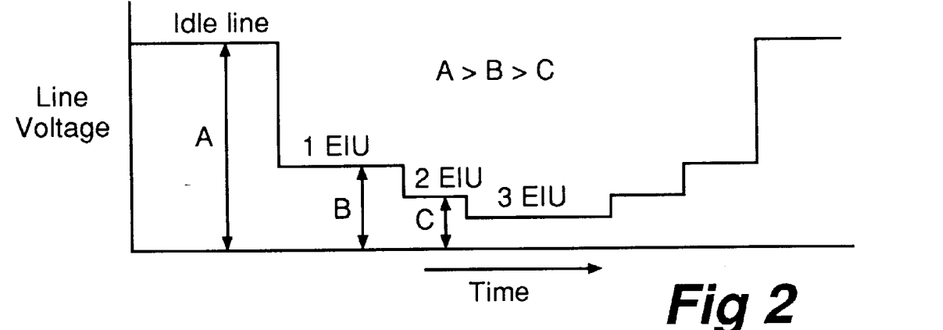
FIG. 2 shows typical DC conditions of a subscriber's line when one or more telephone sets go off-hook at different times.

FIG. 2 shows typical DC conditions of a subscriber's line when one or more telephone sets go off-hook at different times. Normally the line voltage is somewhere above 20V (voltage A), when there are no sets off-hook (idle line), depending on the battery (usually either 24V or 48V, in the latter case, voltage A is about 35V). When a single set goes off-hook, the voltage falls significantly to voltage B (typically about 10 volts). If another set goes off-hook (1 EIU, extension-in-use), the voltage falls further, however not nearly as drastically as when the initial set went off-hook (i.e. % change in line voltage is much less). This voltage is C and is typically about 7 volts. Each further extension set that goes off-hook on the same line pulls the line voltage down yet further, but by continually smaller amounts. In this description, these DC voltages (when two or more sets are off-hook) are collectively called EIU. It is further noted that all the off-hook compatible equipment are described here as off-hook extension sets or simply sets. It should also be noted that the above description deals with the voltage changes but the current in the loop exhibits changes similar to those of the voltage. In certain implementations, the current is monitored instead of voltage.

The invention detects the presence of two or more sets in use and ensures that all the sets coordinate their response to in-voiceband signals from the office switch so that various customer services can be performed.

Figure 3:
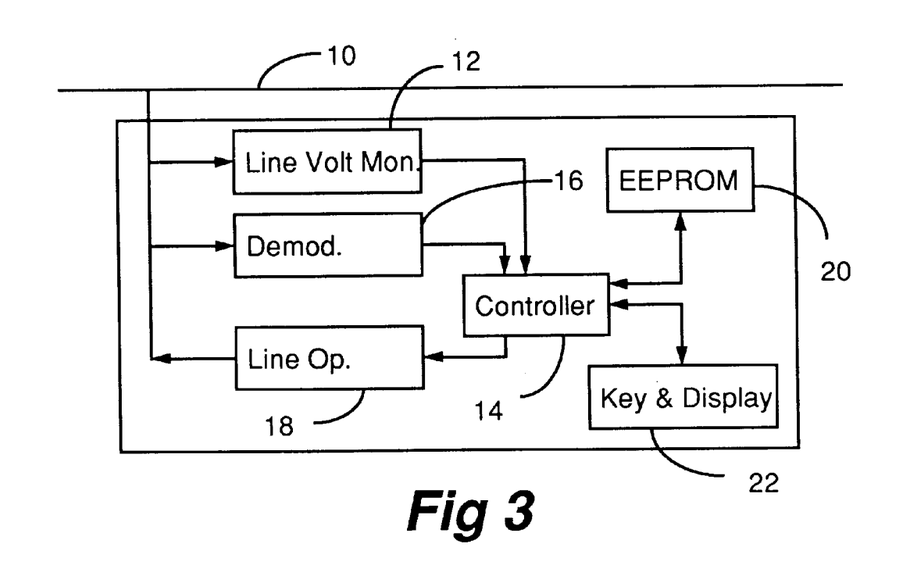
FIG. 3 is a functional block diagram of the invention according to one embodiment.

FIG. 3 is a functional block diagram of the invention according to one embodiment. It should be noted here that the block diagram includes only functions which are related to the invention. These functions can be built into an adjunct to be attached to an existing host set or can be made as part of a customer's premises equipment. It should also be noted that elements which perform these functions in the diagram therefore may be independent elements in an adjunct or reprogrammed host elements.

In the Figure, the DC voltage of a telephone line 10 is monitored by a line voltage monitoring module 12. The module measures the DC voltage by comparing it with a reference voltage and uses an analog-to-digital converter (ADC) to produces digital signals to indicate no-extension-in-use (NEIU), extension-in-use (EIU), on-hook, off-hook etc. The ADC is read once every 20 ms in this embodiment and a microcontroller 14 runs the parallel set detect SM (state machine) with the line voltage reading. The actual reading of the ADC is done over 16 calls of the timer interrupt. It interrupts every 0.25 ms and therefore takes about 4 ms to read the ADC. The state machine will be described in detail later.

Demod module 16 includes a demodulator which demodulates FSK data in CLASS message and it also includes a CAS detector which detects the CAS tone. When the demod module receives FSK data, it asynchronously sends it to a microcontroller 14. When the set is on-hook and no extensions are in use, the demodulator is always enabled and the microcontroller 14 is ready to decode a CLASS message. The demodulator is disabled during ringing bursts and whenever an extension comes into use. When an extension is in use, the CAS tone detector is enabled because a CAS tone is expected to indicate that SCWID data is forthcoming. After detection of a CAS tone, e.g., 150 ms later, the microcontroller either enables the demodulator to decode the SCWID FSK data or instructs a line operation module 18 to generate an ACK signal, depending upon whether or not an extension is in use. In addition to generating an ACK signal, the line operation module 18 performs DC break, muting of voice path, etc. The figure also includes further modules of EEPROM 20 which stores all the necessary programmed functions and key/display combination 22.

According to one embodiment of the invention, by following a set of pre-programmed rules, SCIWD equipped telephone sets or adjuncts can coordinate their activities so that call waiting caller ID (off-hook caller ID) or other services can work and maintain BellCore recommendations even if there are off-hook extensions of compatible types. The set of rules ensures that there is one set which generates an ACK signal tone because the office switch may not property detect it if there are more than one set responding with an ACK signal.

Figure 4:
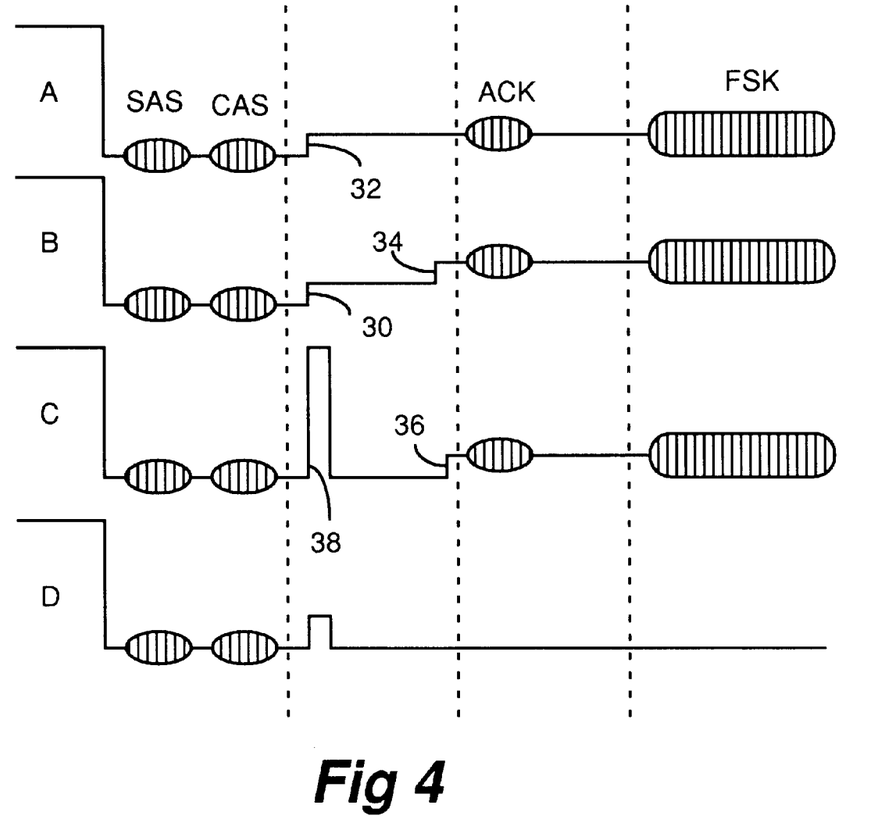
FIG. 4 illustrates graphically DC conditions for some typical cases in which line voltage changes are put in the same time scale.

When multiple sets are off hook, each must be assigned as master, slave or back_up_master. When a SCWID signal (e.g. CAS) is received from the office switch, only the master will acknowledge, by generating an ACK signal. Slaves will never generate an ACK signal. The master is defined as the set that went off hook first. All sets monitor DC loop conditions. FIG. 4 illustrates these DC conditions for some typical cases in which line voltage changes are put in the same time scale. If there is no other extensions off-hook when a set goes off-hook, then this set is the master. Otherwise the set is a slave. The master clears its master status when it goes on-hook. The master and slave statuses are assigned dynamically on a per-call basis.

Rules for Slaves i) If a set goes off hook and extension in use is active then that set is a slave. Slave status is assigned dynamically on a per call basis. Any set can be a slave set.

ii) When slaves detect a CAS, they must remove their DC terminations and mute voice paths within approximately 20 ms. They must not respond with an ACK.

iii) They must monitor the loop AC conditions and receive and display the FSK data containing the call waiting callers identity or other information.

iv) Upon successful reception of FSK data or a time-out, slaves will reestablish their DC terminations and voice paths.

Rules for Master i) When a master detects a CAS, it must mute its voice path and measure the DC conditions on the loop. If there are no extensions present (except the master itself), the master will respond with an ACK. The master acknowledges the CAS and FSK data exchanges take place. This is shown by line A in FIG. 4. In this case the master detects no EIU because the line voltage has not changed when CAS was detected.

ii) All similarly equipped off-hook sets will be slaves and will have removed their DC terminations and muted their voice paths. The master detects EIU because of changes in line voltage at 30. This is illustrated by line B of FIG. 4.

iii) All non-equipped off-hook or non compatible off-hook sets will not have removed their DC terminations. The master senses this condition and will not respond with an ACK.

Rules for Back Up Master (BUM)

i) If master drops out of a call while there are two or more slaves left, a back up master (BUM) must respond with an ACK. The BUM is dynamically assigned to the last successful ACKer. A BUM can be on- or off-hook. The BUM will only ACK if there is no master. This can be determined since the master never removes its DC termination the duration of the call.

ii) A BUM is defined as the last unit to have successfully responded with an ACK. After a successful SCWID call, all units update their BUM status. The unit which responded with an ACK becomes the BUM. All units which received SCWID data, but did not respond with an ACK, clear their BUM status. The BUM can be on- or off-hook. For this reason the BUM status is not set or reset when a set goes off- or on-hook.

iii) If an on-hook BUM detects CAS, it checks DC conditions on the loop. If there are no extensions present, the back up master will seize the line by reapplying the DC termination and responds with an ACK. If an off-hook BUM detects CAS, it checks DC conditions on the line, if there are no extensions except itself present, it will also reapply the DC termination and responds with an ACK. The off-hook BUM will then set its master flag. Line C in FIG. 4 illustrates these operations of BUM and slaves. A large rise 38 indicates the removal of DC terminations by BUM and all the slaves. When the BUM reseizes the line by applying its DC termination which drops the line voltage again.

iv) All similarly equipped off-hook sets will be slaves and will have removed their DC terminations and muted their voice paths. It should be noted that in Lines A, B, and C of FIG. 4, small voltage rises 32, 34, and 36 are shown before ACK to indicate difference in DC characteristics of DC termination circuit when one is connected. This is because, when muting or other functions are to be performed, it is possible that a separate DC termination circuit may be inserted in place of the existing one.

v) If there are sets on the loop which are not equipped with SCWID capability and are presently off-hook, they will not have removed their DC terminations. In this case the back up master will not respond with an ACK.

vi) This arrangement will also arbitrate the case where the first unit off-hook is a non-compatible SCWID set, two or more slaves go off-hook and then the non-compatible SCWID set drops out of the call. Also if the first set off-hook is a non SCWID set, it will be assumed the master by all other sets even though it cannot generate an ACK tone. FIG. 4 illustrates this by line D.

Other complications arise if there are non-compatible SCWID sets involved as a slave in a call. The master must detect this and must not respond with an ACK signal (to keep unmuted ACK/FSK from blasting user). This is resolved since all slaves remove their DC terminations when a CAS is detected. Since the non-compatible SCWID sets will not remove the DC termination, the master can look for EIU after CAS is detected. If EIU is true than the master will not responds with an ACK. If EIU is not true then the master will respond with an ACK.

Figure 5:
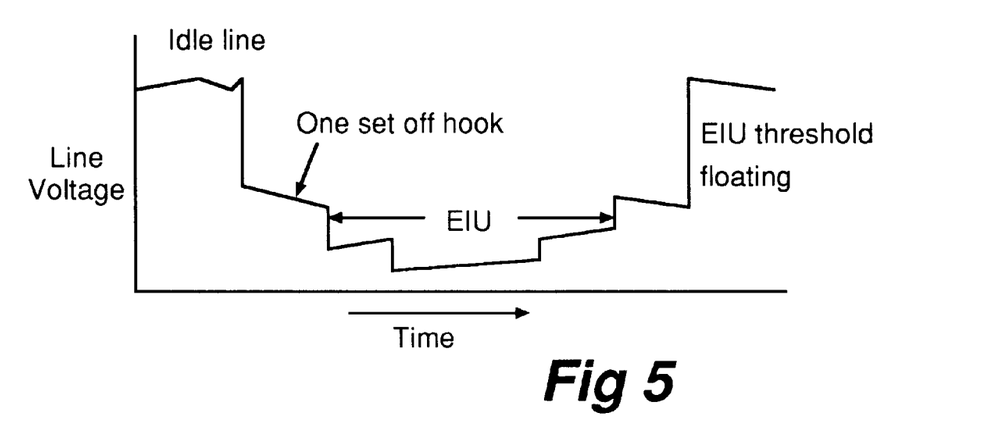
FIG. 5 shows graphically gradual changes of the voltage over time.

When a set goes off-hook and starts monitoring the line voltage, it is not guaranteed to remain at a steady level. As seen in FIG. 5, it may in fact drift up and down by a significant amount, in other words the EIU threshold floats. This gradual change must be monitored and compensated. A significant drop in the line voltage is indicative of an extension in use. When this drop occurs, the value that triggered it is saved. The line voltage must rise above this value before the set triggers no extension in use. The microcontroller and EEPROM can be properly programmed to adjust such drift so that the threshold values would vary appropriately.

As described earlier, if there are two or more sets are in use on a loop, a hook flash (line break) by any one of the sets in use is not possible because the remaining sets in use maintain the DC connection.

According to another embodiment, the invention detects the presence of two or more sets in use and enables any one of the sets to perform the hook flash. In short, extension sets in use are detected by monitoring the drops and changes in the line voltage (called EIU, extension-in-use) and when one of the sets performs the hook flash, all the sets in use coordinate their hook flashes so that the office switch is able to detect a proper hook flash. In one embodiment, the line operation circuit shown in FIG. 3 includes the functionality of hook flash or link.

Figure 6:
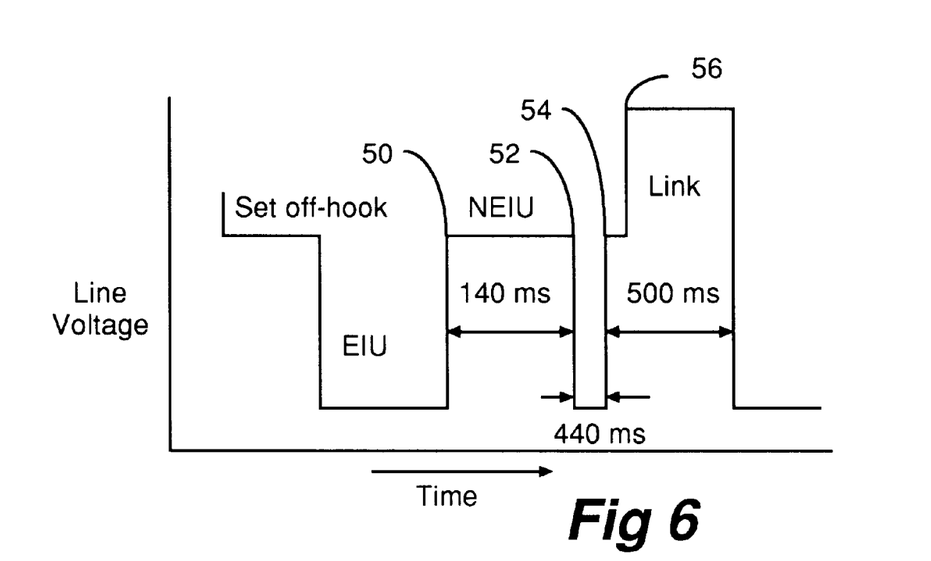
FIG. 6 shows the operation of the coordination of flashes according to one embodiment.

FIG. 6 shows this operation according to one embodiment. Under a set of preset rules, one of the sets which wishes to perform a hook flash is made flash master, all other sets are made flash slaves. The flash master is the set on which a key called FLASH key (also called link key or call waiting option key) is pressed for performing a coordinated hook flash. It should be noted here that this inventive feature can be embodied as part of a SCWID equipped telephone set or can be made as a SCWID adjunct set which is to be attached to an existing host set. Therefore in the case of the adjunct set, it could become the flash master if FLASH or LINK key is pressed on the host set or if its own FLASH or LINK key is pressed.

The flash master performs a synchronizing pulse or prelink of about 140 ms duration, followed by an interlink pause of about 300 ms duration and then a line break of 300–1500 ms. At 50, the EIU disappears for the duration of a prelink approximately 140 ms, then it reappears for about 440 ms at 52. If this happens, when the EIU disappears the second time at 54, all the sets in use then at 56 link too, generating a true line break. The first flash, which can be called a link subsignal or prelink, signals to the slaves sets that they should flash. The second flash the master generates is timed to coincide with a flash generated in all the slaves. The flash slaves monitor the DC conditions on the loop. If they see a predetermined increase in loop voltage that lasts approx. 140 ms followed by approx. 440 ms of original loop conditions (interlink) followed by a rising edge of loop voltage, they perform their own flash which coincides with the second flash performed by the master. In this way all extensions perform a simultaneous flash and the switch will actually see a 600 ms interval of zero loop current.

Figure 7:
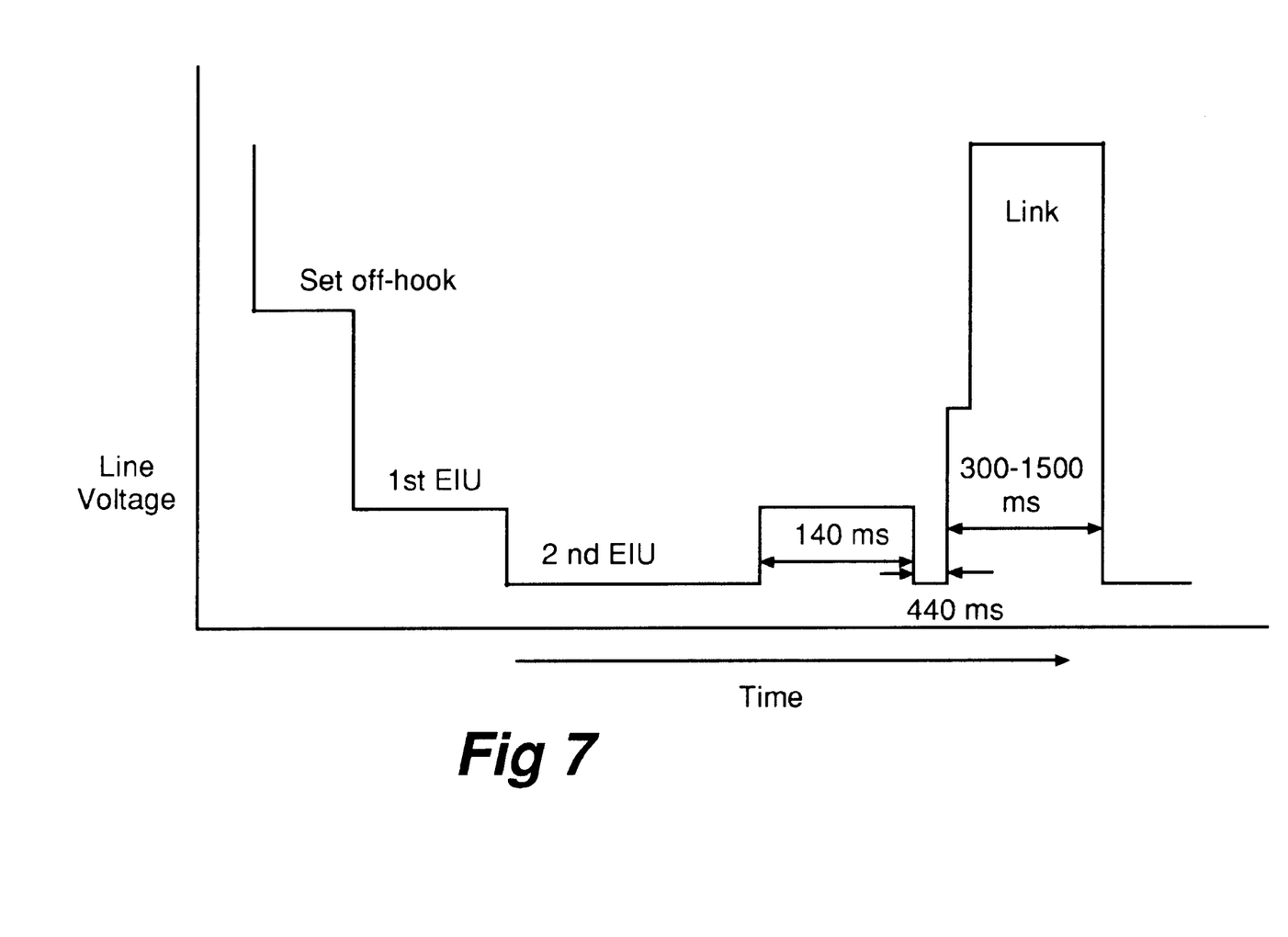
FIG. 7 shows the line voltage when more than one extension is off-hook and they coordinate flashes according to another embodiment.

This procedure also works when there is more then one EIU. Referring to FIG. 7, whenever an extension is in use, there is a remote link threshold value that is $\frac{1}{16}$ more than the present off-hook line voltage. The figure shows two threshold values which are $\frac{1}{16}$ above the present EIU. When the voltage rises above this value, and follows the timing characteristics set out above, all sets know that a link needs to be performed, and do one themselves on the second rise in voltage.

Following is the Parallel Set Detect (PSD) state machine (SM) which performs a variety of tasks. It is responsible for determining if there are any extensions in use (EIU) and generating trip appropriate EIU events. It also has the capability to generate hook flashes even when extensions are in use (if the extensions have the capability). It does this by synching links with the extensions in use, and by linking at the same time they generate a hook flash. This state machine is called every 20 ms at interrupt time from the 4 ms interrupt. This state machine contains two sets of states that do not interact with each other. Only one set of states is active at a time, depending whether the set is in an on-hook or off-hook state. The code that dispatches control to the correct state, determines if the correct states are active, and if not activates the other set. The dispatching code also maintains a counter used by the various states.

Figure 8:
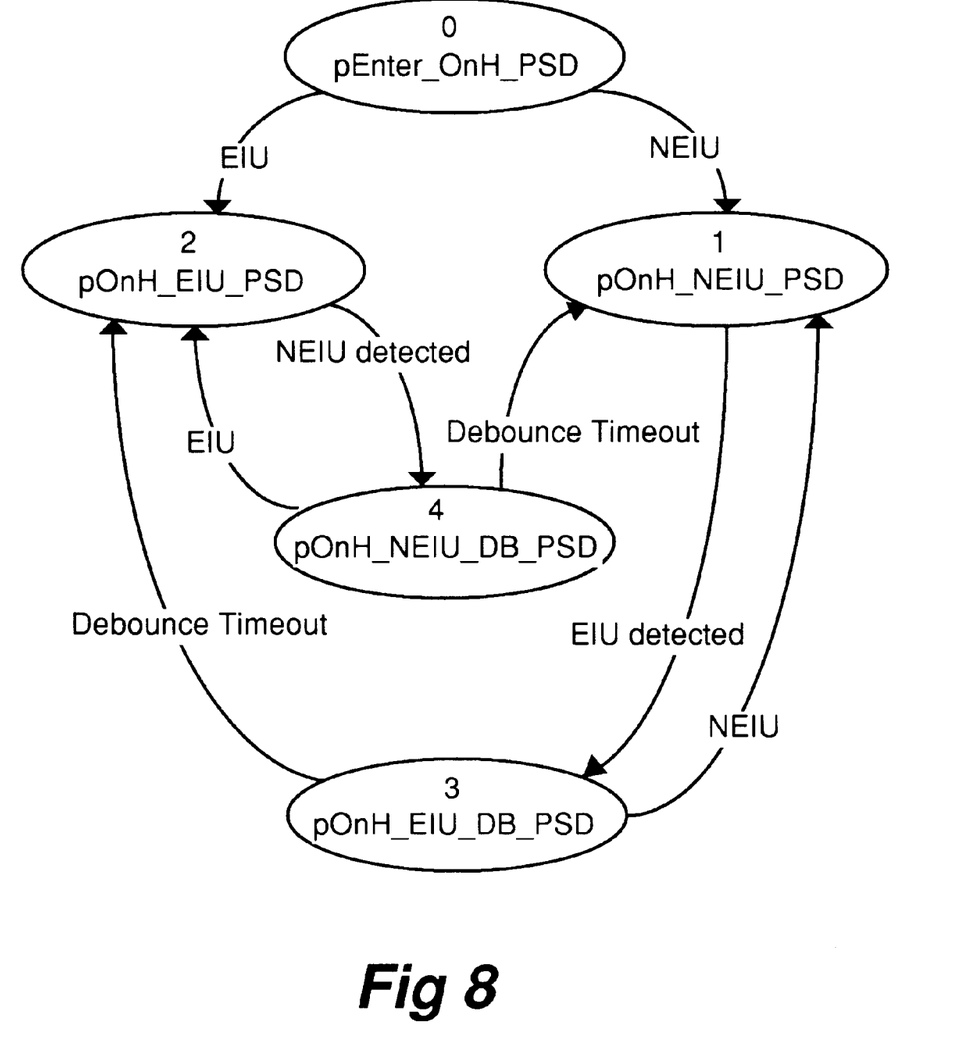
FIG. 8 is an on-hook Parallel Set Detect (PSD) state machine.

Referring to FIG. 8, the on-hook PSD is extremely simple and is handle by 5 states. There is a simple threshold value (30 V for a 48 V battery, 15 V for a 24 V battery, both in the EEPROM) which the line voltage is continually compared against. If the line voltage is below this threshold, an extension is presumed to be in use. Check Phone Cord is also in this SM. When EIU, if the voltage falls extremely low, below 2 or 3 volts, EIU is switched to Check Phone Cord. The states work as follows:

State 0 becomes active whenever the set goes on-hook. It simply determines whether or not an extension is in use and passes control to either state 1 or 2 the current state. This state also sets up the current path through the adjunct for on-hook idle.

State 1 stays active until the line voltage falls below the threshold, in which case it passes control to state 3.

State 2 stays active until the line voltage rises above the threshold, in which case it passes control to state 4.

State 3 simply makes sure the line voltage stays below the threshold for a certain period of time and then generates an EIU event and passes control to state 2, otherwise it returns to state 1. The amount of time that the line voltage is debounced for is controlled by a byte in the EEPROM.

State 4 simply makes sure the line voltage stays above the threshold for a certain period of time and then generates a NEIU event and passes control to state 1, otherwise it returns to state 2. The amount of time that the line voltage is debounced for is controlled by a byte In the EEPROM.

Figure 9:
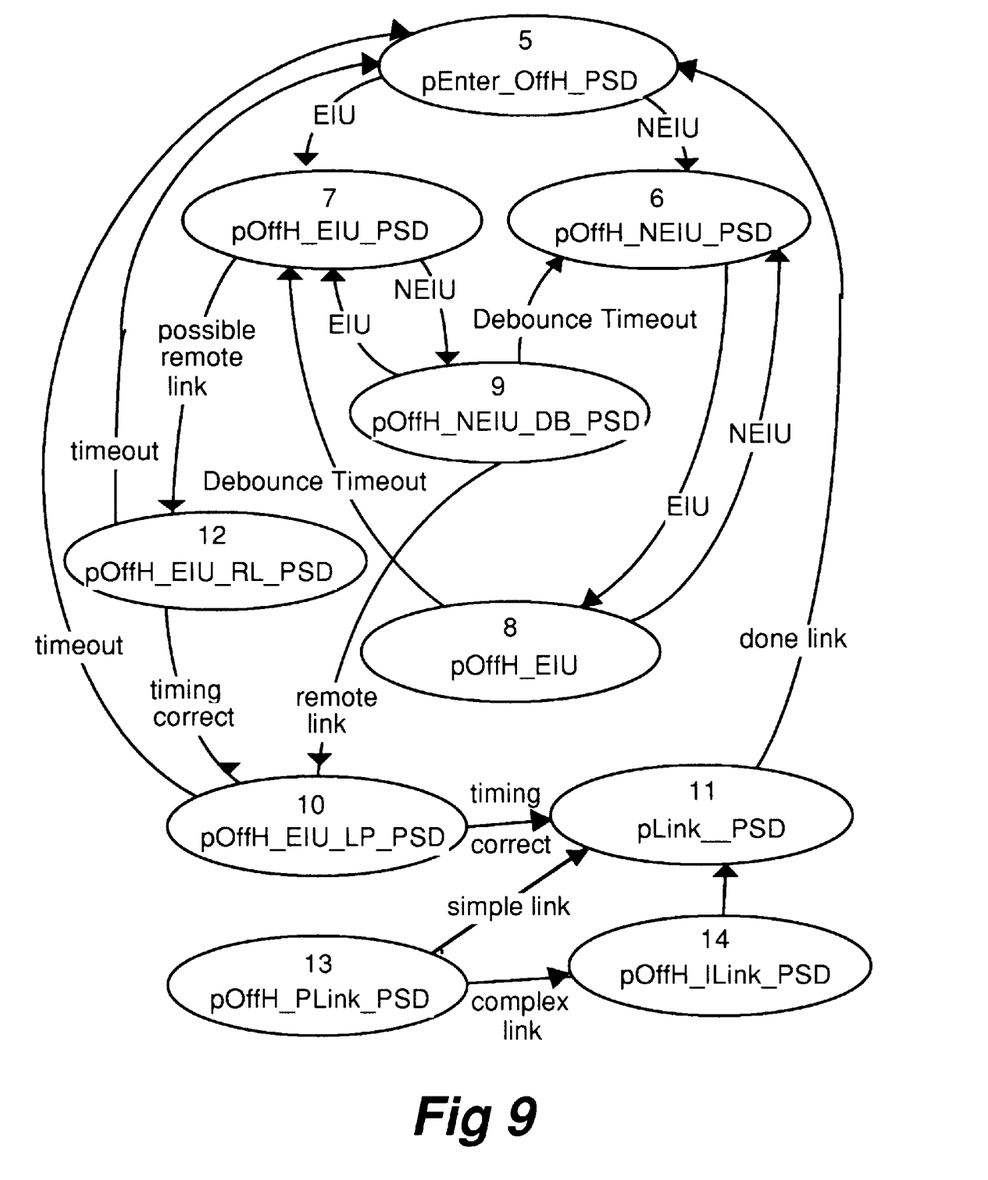
FIG. 9 is an off-hook Parallel Set Detect (PSD) state machine.

Referring to FIG. 9, the off-hook PSD is a lot more difficult. Extensions must be detected by observing small relative drops in the line voltage. To further complicate things, remote links must be detected in this state. Remote links are basically the disappearance of EIU for a brief period of time. The off-hook PSD SM also performs links, both simple and multiple links intended to give extensions the chance to link as well. The states work as follows:

State 5 becomes the current state whenever the set goes on-hook. It delays further PSD activity for 100 ms to give the VCO time to stabilize. Using all available information, it then takes its best guess at whether or not an extension is in use, and passes control to either state 6 or 7. It also sets up the current path through the adjunct for off-hook idle.

State 6 is active when there is no extension in use. If it detects a sufficient enough voltage drop, it passes control to state 8.

State 7 is active when there are one or more extensions in use. If it detects the voltage rising above the recorded no EIU threshold, it passes control to state 9 active. If it detects a slight rise in voltage that could be a remote set doing a link (this would happen if there was more than 1 EIU), it makes state 12 active.

State 8 simply makes sure that the line voltage remains low for a period of time before generating an EIU event and then making state 7 active. If the line voltage doesn't stay low long enough, it returns control to state 6. The debounce time is in EEPROM.

State 9 simply makes sure the line voltage remains high for a period of time. If It does remain high it makes state 6 active and generates a NEIU event. If it falls low it returns to state, 7 unless it falls within a link time event window, in which control passes to state 10. The debounce time, and link window time are all in the EEPROM.

State 10 is waiting for another link after one has already been detected. It times out after a period of time (controlled in EEPROM), and jumps to the entry state 5. If a link is detected, control is passed to state 11, where a link is performed.

State 11 performs a timed link, and then jumps to the entry state 5. The duration of the link is in the EEPROM.

State 12 times the duration of slight voltage rise. This would be caused when there is more than one EIU, and one them does a link. The state times the voltage rise, and if it falls into the link window, it passes control to state 10, otherwise it jumps to the entry state 5.

State 13 becomes active when this set is to perform a link. The state determines if one or two links should be done (depending on EIU status, and whether super links are enabled). If only one link is necessary, control slips to state 11, otherwise this state performs one link and then passes control to state 14.

State 14 controls the amount of time between two links. It then passes control to state 11.

What is claimed is:

1. In a telephone loop which contains a plurality of telephone sets at one end and a telephone switch at the other end, a method of acknowledging a customer alert signal sent by the telephone switch when the telephone loop is in the condition in which at least one telephone set of the plurality of telephone sets is off-hook, comprising steps of:

assigning a first telephone set to transit to off-hook state as a master among the plurality of telephone sets and the remaining telephone sets as slaves during a telephone call; and detecting the customer alert signal at the master, and appropriately responding to the customer alert signal upon the master determining the state of one or more remaining telephone sets to indicate that the plurality of telephone sets are ready to receive off-hook signals from the telephone switch.

2. The method according to claim 1, comprising further steps of:

assigning one of the plurality of the telephone sets as a back up master, when the master has gone on-hook during said telephone call; and detecting the customer alert signal at the back up master, and appropriately responding to the customer alert signal upon the back up master determining the state of one or more remaining telephone sets to indicate that the plurality of telephone sets are ready to receive off-hook signals from the telephone switch.

3. The method according to claim 1 comprising a further step of removing a DC termination circuit at all the telephone sets for a predetermined period of time after the reception of the customer alert signal.

4. The method according to claim 3 comprising a further step of reapplying the DC termination circuit at all the telephone.

5. The method according to claim 2 wherein the step of responding comprises a step of sending an acknowledgment signal from the back up master to the switch.

6. The method according to claim 5 comprising a further step of receiving an FSK signal from the switch after the acknowledgment signal.

7. The method according to claim 1 comprising a further step of muting the voice path for a predetermined period of time at all the telephone sets after the detection of the customer alert signal.

8. The method according to claim 7 wherein the step of responding comprises a step of sending an acknowledgment signal from the master to the switch.

9. The method according to claim 8 comprising a further step of receiving an FSK signal from the switch after the acknowledgment signal.

10. The method according to claim 9 comprising a further step of displaying the FSK signal at any of the telephone sets.

11. A telephone set to be connected to a telephone loop comprising:

a circuit for monitoring the DC condition of the telephone loop to determine if one or more telephone sets are off-hook state among a plurality of telephone sets which are connected to the telephone loop;

a demod circuit for detecting a customer alert signal sent by the switch connected to the telephone loop when the telephone loop is in an off-hook condition;

a line operation circuit for sending an acknowledgment signal in response to the customer alert signal; and a controller for assigning one telephone set among the plurality of telephone sets as a master during a telephone call if it is the first telephone set to transit to off-hook state in said telephone call and for enabling the line operation circuit.

12. The telephone set to be connected to a telephone loop according to claim 11 further comprising:

the controller for assigning one of the remaining telephone sets as a back up master, if the master goes on-hook, and for enabling the line operation circuit if the telephone set is assigned as back up master.

13. The telephone set according to claim 11 further comprising a DC termination circuit which can be inserted into and removed from the telephone loop in response to command from the controller.

14. The telephone set according to claim 13 further comprising a voice path muting circuit which can be inserted into and removed from the telephone loop in response to the controller.

15. A telephone station apparatus of a type which includes a display means for displaying information in response to coded signals received from a telephone switching facility, comprising:

a network including a direct current path and voice band signals path;

a line status detector for detecting the state of the telephone line as being one of ON HOOK and OFF HOOK;

means responsive to an occurrence of a first predetermined signal from the telephone switching facility and thereafter, within a fixed time interval, an occurrence of a second predetermined signal for muting the voice band signals path throughout a predetermined period of time, during the OFF HOOK state;

means responsive to a signal from the line status detector for registering either of two conditions:
(a) if the telephone station apparatus was the first apparatus to transit to the OFF HOOK state, or
(b) if the telephone station apparatus was the subsequent apparatus to transit to the OFF HOOK state during any one interval when at least one telephone station apparatus connected to the telephone line is OFF HOOK;

means for causing an acknowledgment signal to be transmitted to the telephone switching facility while the transmit and receive paths are muted, conditional upon the means for registering having registered condition a) in the telephone station apparatus;

whereby the telephone switching facility is enabled to transmit the coded signals.

16. The telephone station apparatus according to claim 15 wherein the information being displayed concerns a calling party.

* * * * *